May 23, 1961   H. F. RODGERS ET AL   2,984,975
OIL PUMP DRIVES FOR PROPELLER-GAS TURBINE ENGINE INSTALLATIONS
Filed June 18, 1956
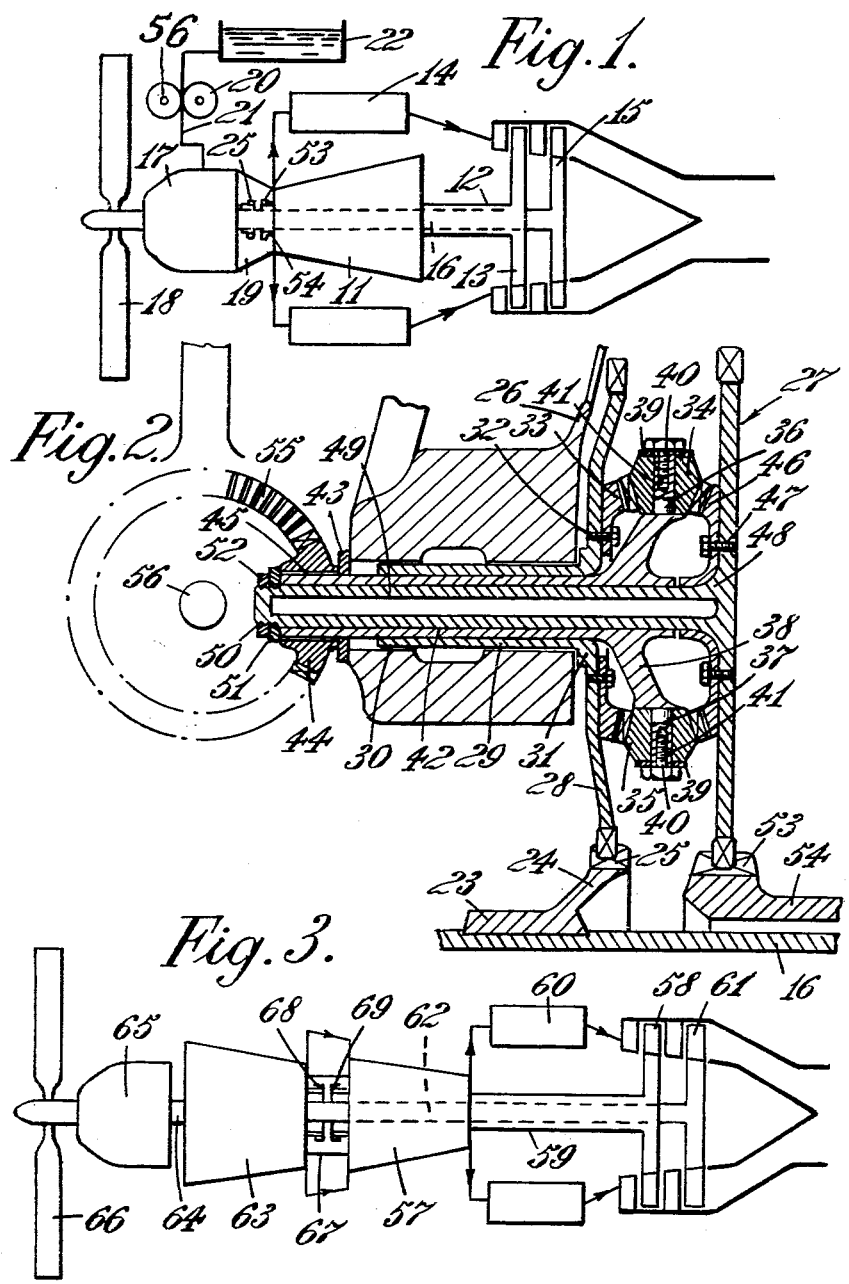

United States Patent Office 2,984,975
Patented May 23, 1961

2,984,975
OIL PUMP DRIVES FOR PROPELLER-GAS TURBINE ENGINE INSTALLATIONS

Harry Frederick Rodgers and Ernest Victor Harvey, Bristol, England, assignors, by mesne assignments, to Bristol Siddeley Engines Limited, Bristol, England, a British company Filed June 18, 1956, Ser. No. 592,062

Claims priority, application Great Britain June 22, 1955

9 Claims. (Cl. 60—39.08)

This invention relates to gas turbine engine installations driving propellers, and concerns such installations which are of the kind (hereinafter referred to as of the kind described) comprising two independent rotary systems each including a turbine, one of which turbines is connected to drive a compressor, and the other of which turbines is connected to drive a propeller through suitable reduction gearing. The turbine which is connected to drive the propeller may, in addition, be connected to drive a further compressor directly.

When starting engine installations of the kind described it is usual to drive the rotary system which is independent of the propeller and allow the rotary system which includes the propeller to follow the driven rotary system independently. In this case, the rotary system including the propeller does not commence to rotate as soon as the driven rotary system is set in motion by the starting means, but picks up as the speed of the driven rotary system increases.

Lubricating oil is supplied to the plain bearings, ball or roller bearings and gear teeth of the reduction gearing, and to other bearings throughout the engine, usually from a single main oil pump which is also used to supply the oil as pressure fluid to the constant speed unit which controls the pitch changing movements of the propeller, and in installations of the kind described this main oil pump is driven from the rotary system which is independent of the propeller, so that the bearings of the engine are properly lubricated during starting. In this case, however, if, when the engine installation is running, the fuel supply to the installation is shut off, and the propeller is not immediately feathered, the propeller will windmill at a speed approaching its normal cruising speed, and consequently the rotary system to which it is coupled will continue to rotate at a fairly high rate, whereas the rotary system which is independent of the propeller will windmill at a relatively low rotational speed only. Under these conditions, the output of the main oil pump is negligible, and if the propeller system is permitted to windmill at a speed approaching its cruising speed, even for relatively short periods, due for example to a temporary inability to feather the propeller, then the reduction gearing bearings and the engine bearings associated with the rotary system which drives the propeller, are starved of lubricating oil. Although this is not critical with ball or roller bearings, plain bearings, such as are used for the sun and planet gear wheels commonly forming part of the reduction gearing, may be damaged.

In order to meet this difficulty, the present invention provides a gas turbine engine installation of the kind described, including a main oil pump of the engine and a driving arrangement for said main oil pump, which driving arrangement comprises a differential mechanism, first transmission means drivably connecting one element of said differential mechanism with one of said rotary systems, a second transmission means drivably connecting another element of said differential mechanism with the other of said rotary systems, and third transmission means drivably connecting the third element of said differential mechanism with said main oil pump, the arrangement being such that the oil pump is driven at a speed which is a function of the sum of the rotational speeds of said two independent rotary systems.

With a driving arrangement as just defined, if when the fuel supply to the engine is shut off so that the speed of the rotary system which is independent of the propeller falls to a low value, the rotary system which includes the propeller continues to rotate at a high speed, the bearings which are supplied with lubricating oil by said main oil pump are not starved of lubricating oil because the main oil pump continues to be driven, albeit at a lesser speed, from the rotary system which includes the propeller.

One embodiment of the invention will now be described merely by way of example with reference to the accompanying drawings in which:

Figures 1 and 3 are diagrammatic representations of gas turbine engine installations of the kind hereinbefore described, and Figure 2 is a cross-sectional view to a larger scale showing how a differential mechanism is used in the installation of Figure 1 and Figure 3 for driving the main oil pump of the engine of the installation.

Referring to Figure 1, a gas turbine engine installation has two independent rotary systems, one of which comprises a compressor 11, the rotor of which is driven through a hollow shaft 12 by a turbine rotor 13. Air compressed in the compressor is delivered to a number of combustion chambers 14 in which the air is heated by the combustion of fuel, and the resultant high velocity gases are directed through the turbine rotor 13, to drive the rotor of the compressor 11. After passing through the turbine rotor 13, these gases are directed into a second turbine stage, the rotor 15 of which is disposed coaxially with respect to the rotor 13 and has a shaft 16 secured to it which extends through the shaft 12 and through the rotor of the compressor 11 to drive reduction gearing in the form of a reduction gear unit 17 upon the output shaft of which a propeller 18 is mounted. The rotor 15, shaft 16, gear unit 17, and the propeller 18 thus constitute a second rotary system which is independent of the rotary system made up by the rotor 13, the shaft 12, and the rotor of the compressor 11.

In the example at present being described the compressor 11 has its air intake on the side of the compressor adjacent the turbines.

A gear casing 19 is provided interconnecting the compressor 11 and the casing of the reduction gear unit 17. The reduction gear unit 17 incorporates sun gear, planet gear and peripheral gear wheels to form a straight spur epicyclic train, the sun and planet gear wheels being mounted upon plain bearings. The internal construction of the gear unit 17 is not shown in the drawing as this type of gear unit is already well known.

The plain, roller and ball bearings of the reduction gear and the engine bearings are supplied with lubricating oil by a main oil pump 20 of the engine of the installation through a supply conduit 21, the pump drawing oil from a sump 22. The manner in which this pump is driven will now be described with reference to Figure 2.

Referring to Figure 2, a sleeve 23 is mounted upon the shaft 16 and fixed rigidly thereto in any convenient manner, e.g. by splines. This sleeve is provided with an outwardly directed flanged part 24 which incorporates a ring of gear teeth 25 the flanged part 24 and ring of teeth 25 constituting a gear wheel. The interior of the gear casing 19 incorporates a boss 26 in the casting which supports differential mechanism in the form of a differential gear unit which is indicated generally at 27. The gear teeth 25 mesh with a gear wheel 28 which constitutes a first transmission means drivably connecting one element of the differential gear 27 with the second rotary system previously described. The gear wheel 28 is provided with a hollow shaft 29 integral therewith which is parallel with the shaft 16 and journalled in a bearing formed by the projection 26, the shaft 29 being a running fit in a bore 30 in the boss 26. A thrust shoulder 31 is provided at the juncture of the shaft 29 and gear wheel 28 which shoulder bears against the right-hand face in Figure 2 of the projection 26 around the opening at the right-hand end in Figure 2 of the bore 30. Secured to the gear wheel 28 by bolts 32 and coaxial therewith but of somewhat smaller diameter is a bevel gear wheel 33 constituting one element, the first element, of the differential gear 27. The bevel gear wheel 33 meshes with two planetary bevel gear wheels 34 and 35 disposed in a plane at right-angles to bevel gear wheel 33. The planetary bevel gear wheels 34 and 35 are mounted for free rotation upon spigots 36 and 37 projecting from planet carrier in the form of a spider member 38, which spider member constitutes with the planetary gears 34 and 35 another element, the third element, of the differential gear. The gear wheels 34 and 35 are held on the spigots 36 and 37 by washers 39 and bolts 40 which screw into tapped holes 41 in the end of the spigots. The spider member 38 is provided with a hollow shaft 42 which extends through the gear wheel 28 and is journalled in the hollow shaft 29, the shaft 42 having a part which projects from the shaft 29 and from the projection 26 on the side thereof remote from the differential gear.

A thrust washer 43 is fitted upon the projecting part of the shaft 42 and bears against the left-hand face in Figure 2 of the bore 30. A bevel gear wheel 44 is mounted on the end of the shaft 42 by means of splines 45. The right-hand face of this bevel gear wheel bears against the left-hand face of the thrust washer 43.

The planetary bevel gear wheels 34 and 35 mesh on the opposite side from bevel gear wheel 33 with another bevel gear wheel 46 in coaxial relation with bevel gear wheel 33 and constituting the remaining element, the second element, of the differential gear. Bevel gear wheel 46 is secured by bolts 47 to a gear wheel 48 so as to be coaxial therewith. The gear wheel 48 is larger in diameter than the bevel gear 46, and constitutes a second transmission means which drivably connects the second element of the differential gear 27 with said one rotary system previously described, i.e. the rotary system including the compressor and the turbine rotor 13, in a manner hereinafter described. The gear wheel 46 is provided with a shaft 49 integral therewith which passes through the member 38 and the gear wheel 28 and is journalled in the hollow shaft 42, the shaft 49 projecting beyond the bevel gear wheel 44. The end of the shaft 49 is threaded at 50 and a member in the form of a washer 51 located by a nut 52 screwed on to the thread 50 locates the gear wheel 44 in one axial direction with respect to the shaft 42 the gear wheel 44 being located in the other axial direction with respect to the shaft 42 by the washer 43, which bears on the projection 26. The nut 52 and the washer 51 also locate the shaft 49 in one axial direction with respect to the shaft 42, the washer 51 bearing on the adjacent end face of the shaft 42. In the other axial direction the shaft 49 is located by the engagement of a boss 46' on the gear wheel 46 with a boss 38' on the spider member 38.

The shafts 29, 42, and 49 are dimensioned such that they are freely rotatable each with respect to the others.

The gear wheel 48 meshes with a gear wheel formed by a ring of gear teeth 53 provided on an outwardly directed flange on a part 54 which projects from the rotor of the compressor 11 on the side thereof adjacent the gear unit 17, the part 54 lying between the compressor 11 and the unit 17, the part 54 being coaxial with the rotor of the compressor 11 and surrounding the shaft 16.

Bevel gear wheel 44 meshes with a bevel gear wheel 55 disposed in a plane at right-angles thereto and secured in any convenient manner upon a quill shaft 56 which as diagrammatically shown is drivingly connected with the main oil pump 20. In a practical construction the main oil pump 20 is bolted to a facing provided on the outside of the gear casing 19, the quill shaft 56 serving to transmit the drive from the bevel gear wheel 55 arranged within the casing 19 to the pump 20 which is outside the casing. The shaft 56, gear wheels 55 and 44, and the shaft 42 constitute the aforesaid third transmission means drivably connecting the third element of the differential gear 27 with the pump 20.

Referring now to Figure 3, the driving arrangement for the main oil pump just described with reference to Figure 2 may also be used in a propeller driving gas turbine engine installation having "compounded" axial compressors 57 and 63 arranged in direct axial sequence. The high pressure compressor 57 is driven by a high pressure turbine rotor 58 through a hollow shaft 59, the rotor 58 being driven by air delivered by the compressors 57 and 63 and heated by the combustion of fuel in a number of combustion chambers 60. The gases issuing from the combustion chambers 60 after passing through the rotor 58, are directed into a second turbine, the rotor 61 of which is disposed coaxially with the rotor 58 and has a shaft 62 secured to it. This shaft extends forwardly and passes through the shaft 59 and through the rotor 58 to drive the low pressure compressor 63. A shaft 64 extends from the forward face of the low pressure compressor 63 and drives a reduction gear unit 65 upon the output shaft of which a propeller 66 is mounted. In this arrangement the rotor 58, the shaft 59 and the rotor of the compressor 57 make up one rotary system which is independent of the rotary system constituted by the rotor 61, the shaft 62, the rotor of the low pressure compressor 63, the shaft 64, the gear unit 65 and the propeller 66.

A casing 67 is provided interconnecting the low pressure and high pressure compressors and this houses the differential gear 27 as described with reference to Figure 2. In this case, however, gear wheel 28 is driven from a part between the compressors which part is in the form of an annular gear toothed extension 68 on the rotor of the low pressure compressor, and the gear wheel 48 is driven from a second part between the compressors which second part is in the form of an annular gear toothed extension 69 on the rotor of the high pressure compressor, both of the extensions 68 and 69 being coaxial with the rotary system with which it is rotatable.

In operation, when an engine such as that shown in Figure 1 is running normally, the gear teeth 25 on shaft 16 drive gear wheel 28 and the gear teeth 53 on the extension 54 drive the gear wheel 48. Since shaft 16 and extension 54 are rotating in the same direction the gear wheels 28 and 48 also rotate in the same direction, and these gear wheels drive the spider member 38 through the bevel gear wheels 33, 46, 34, and 35 such that bevel gear wheel 44 rotates at a speed equal to half the sum of the rotational speeds of the gear wheel 28 and the gear wheel 48, and therefore drive the oil pump 20 at a speed proportional thereto.

If, however, the fuel supply to the engine is shut off or ceases for any other reason when the aircraft, which the engine is used to propel, is in flight, the compressor ceases, or very nearly ceases, to rotate, but unless the propeller 18 is feathered immediately the propeller continues to rotate at the original or at least at a fairly fast speed due to the effect of the airstream passing over it and to the control action of the constant speed unit which controls its pitch.

Such delay in feathering may be caused by some fault in the feathering system. However, under these conditions the reduction gear bearings will not be starved of lubricant because since the propeller is rotating, the gear wheel 28 is also rotating and consequently the bevel gear wheel 33 drive the spider member 38 through bevel gear wheels 34 and 35, but since the gear wheel 48 has stopped or practically stopped the output speed of the differential mechanism is only about half the speed it would be if both gear wheels 28 and 48 were rotating at normal speeds in the same direction. Nevertheless the bevel gear wheel 44, in rotating at half speed, drives the oil pump 20 sufficiently fast to supply enough oil to the reduction gear bearings to prevent damage thereto, and it will be appreciated that this also applies to the arrangement as described with reference to Figures 2 and 3.

We claim:

1. In an installation having a single gas turbine engine comprising two independent rotary systems each including a turbine one of which turbines is connected to drive a compressor and the other of which turbines is connected to drive a propeller through a reduction gearing, a main oil pump for the engine installation, a differential mechanism for supplying a drive to said main oil pump at a speed which is a function of the sum of the rotational speeds of said two independent rotary systems, first transmission means drivably connecting one element of said differential mechanism with one of said rotary systems, a second transmission means drivably connecting another element of said differential mechanism with the other of said rotary systems, and third transmission means drivably connecting the third element of said differential mechanism with said main oil pump.

2. An installation as claimed in claim 1 wherein said reduction gearing is housed in a casing, and said differential mechanism is housed in a casing which interconnects said reduction gearing casing and said compressor, said reduction gearing and said compressor being located adjacent one another with said differential mechanism therebetween.

3. An installation as claimed in claim 1 wherein said installation comprises a further compressor which forms part of the rotary system which includes the propeller, and said differential mechanism is housed in a casing which interconnects said further compressor with said first said compressor, the two compressors being located adjacent one another with said differential mechanism therebetween.

4. An installation as claimed in claim 2 wherein said differential mechanism is a toothed gear wheel differential, and said interconnecting casing comprises a boss wherein is journalled for bodily rotation a unit comprising the toothed gear wheel differential and three coaxial gear wheels, one connected to each element of the toothed gear wheel differential and constituting respectively members of said first, second and third transmissions.

5. An installation as claimed in claim 3 wherein said differential mechanism is a toothed gear wheel differential, and said interconnecting casing comprises a boss wherein is journalled for bodily rotation a unit comprising the toothed gear wheel differential and three coaxial gear wheels, one connected to each element of the toothed gear wheel differential and constituting respectively members of said first, second and third transmissions.

6. A gas turbine engine comprising a lubricating oil pump for the engine, a first rotating system comprising a first turbine, a compressor, first connecting means drivably connecting the first turbine and the compressor and a first gear wheel connected for rotation by the first turbine, the first turbine, compressor, connecting means and first gear wheel all rotating in the same direction; a second rotating system comprising a second turbine, a propeller, second connecting means drivably connecting the second turbine to the propeller, and a second gear wheel connected for rotation by the second turbine, the second turbine and second gear wheel both being coaxial with and rotating in the same direction as the first turbine; a differential mechanism comprising a third gear wheel meshing with the first gear wheel, a fourth gear wheel coaxial with the third gear wheel and meshing with the second gear wheel, a planet gear means meshing with both the third and fourth gear wheels, and a rotatable spider connected to drive the lubricating oil pump and carrying said planet gear whereby the lubricating oil pump is driven at a rate proportional to the sum of the rotational speeds of the rotary systems.

7. A gas turbine propulsion engine comprising a first rotary system including a turbine rotor; a second rotary system including a compressor and a turbine rotor connected to drive said compressor; a combustion system to receive air from the said compressor and to discharge products of combustion through both turbine rotors; bearings for both rotary systems; a screw propeller operatively connected to be driven by the said turbine rotor of the first rotary system; a lubricating oil pump connected to circulate lubricating oil to the said bearings for both rotary systems; and means operatively connected to said lubricating pump and to said rotary systems to drive the lubricating pump both when either one of the rotary systems is rotating alone and when both the rotary systems are rotating.

8. A gas turbine propulsion engine as claimed in claim 7 further comprising reduction gearing operatively connected between the said turbine rotor and the first rotary system and the said propeller.

9. A gas turbine propulsion engine as claimed in claim 7 wherein said means operatively connecting said lubricating pump to said rotary systems comprises a differential gear system.

References Cited in the file of this patent

UNITED STATES PATENTS

| | | |
|---|---|---|
| 1,996,579 | Johnstone et al. | Apr. 2, 1935 |
| 2,054,802 | Bronander | Sept. 22, 1936 |
| 2,149,785 | Neugebauer | Mar. 7, 1939 |
| 2,538,299 | Dewandre | Jan. 16, 1951 |
| 2,619,797 | Haworth | Dec. 2, 1952 |
| 2,641,324 | Fortescue | June 9, 1953 |
| 2,742,760 | Hodge | Apr. 24, 1956 |
| 2,785,848 | Lombard | Mar. 19, 1957 |

FOREIGN PATENTS

| | | |
|---|---|---|
| 150,759 | Australia | Apr. 2, 1953 |
| 460,242 | Canada | Oct. 11, 1949 |
| 753,517 | France | Aug. 12, 1933 |